June 19, 1934.  R. CHILTON  1,963,826
LANDING SIGHT FOR AIRPLANES
Filed Jan. 24, 1931   3 Sheets-Sheet 1
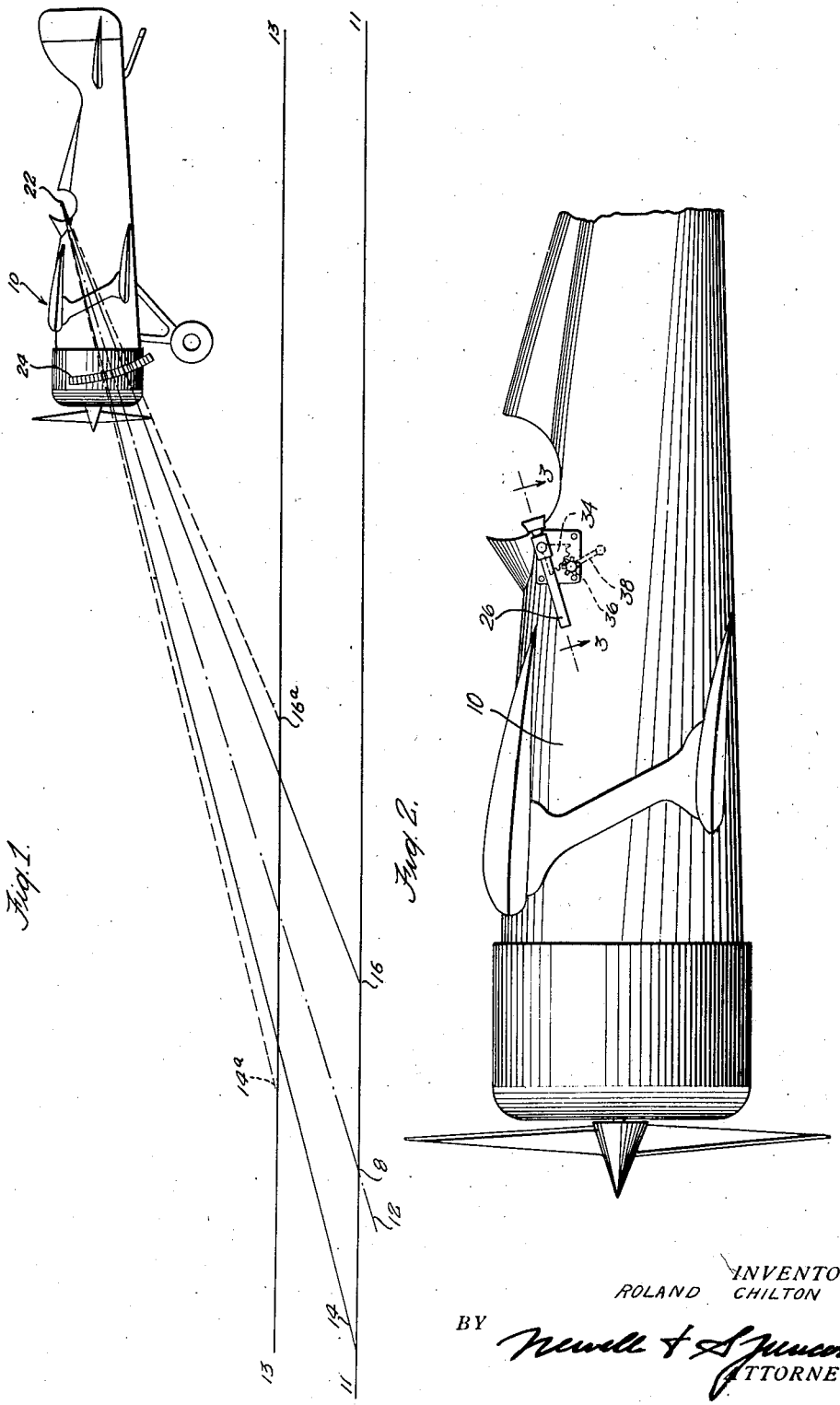
INVENTOR
ROLAND CHILTON
BY
ATTORNEYS June 19, 1934.  R. CHILTON  1,963,826
LANDING SIGHT FOR AIRPLANES
Filed Jan. 24, 1931   3 Sheets-Sheet 2

INVENTOR
ROLAND CHILTON
BY
ATTORNEYS

June 19, 1934.  R. CHILTON  1,963,826
LANDING SIGHT FOR AIRPLANES
Filed Jan. 24, 1931  3 Sheets-Sheet 3

INVENTOR
ROLAND CHILTON
BY
ATTORNEYS

Patented June 19, 1934

1,963,826

UNITED STATES PATENT OFFICE 1,963,826

LANDING SIGHT FOR AIRPLANES

Roland Chilton, Ridgewood, N. J.

Application January 24, 1931, Serial No. 510,884

11 Claims. (Cl. 88—2.2)

This invention relates to a landing sight for airplanes by the use of which the pilot may be able to locate definitely at any instant the point on the ground to which the path of descent is directed.

At and above normal cruising speed the flight path of an airplane substantially corresponds to the attitude of the chord of the wing, but in the relatively slow glide used in approaching a landing, the angle of the flight path is substantially steeper than the angle of the wing and this diversion increases as the speed of the airplane is reduced. In fact, at low speeds the flight path is steepened by raising the nose of the airplane and this reversal of the normal action is very confusing to inexperienced pilots until they have overcome the natural instinct to connect the attitude of the ship with the steepness of the path.

Even the most experienced pilots are not able, from a substantial altitude, to initiate a glide which will bring them in to a specified land point, without maneuvering to shorten the glide, or using power to extend it. It is the absence of such power which causes most accidents in forced landings because the pilot does not realize, until it is too late, that he is going to "undershoot" the landing area he was attempting to negotiate.

Horizontally pivoted vanes which will align themselves with the relative wind have been proposed as landing sights, but the indication obtained is only accurate for zero wind conditions since they function on "air speed" and not on "ground speed".

The principal object of the present invention is to provide a construction by which the pilot of an airplane may readily locate accurately the termination of his glide path regardless of the wind speed, the attitude of the plane or other factors.

It will be seen that whenever the pilot's sight-line is directed along the flight path at a ground object, that object will appear to have no movement relative to a sighting point on the airplane as long as the flight path angle is held constant. On the other hand, a ground object on the near side of the point on the ground toward which the flight path is directed will appear to move backwardly relatively to the sighting point on the airplane, while a ground object ahead of said point on the ground will appear to move forwardly relatively to said sighting point. This invention comprises a construction for rendering these apparent movements and lack of movement of various ground objects obvious to the pilot.

An elementary embodiment of the invention will accordingly comprise a number of lateral sights protruding on one side of the nose of the airplane and preferably arranged in arcuate disposition about the pilot's eye-line and subtending a sufficient angle to include the glide path range of the airplane. In observing the ground through the spaces between these sights the pilot will observe zero movement in one specific space, objects in the other spaces appearing to move forwardly and backwardly from this point.

Such a simple device may be efficient at low altitudes at which the apparent movement of ground objects is rapid but the indication would be difficult to obtain at a glance at high altitudes where the apparent ground movement is relatively slow. Accordingly, a magnification of the ground image may be desirable and various means may be employed for achieving this result.

For example, a telescope of the general type used in connection with gun sights, will give a greatly exaggerated rate of movement of the image and, if such a telescope is arranged pivotally, it may be adjusted by the pilot to obtain the angular setting for zero image movement. With this setting the telescope will be aligned with the flight path and may be used to obtain a sight indicating the terminal point of that particular glide path.

Alternatively, a plurality of magnifying lenses may be arranged in arcuate disposition about an eye piece, the lenses producing magnified images and accelerated apparent movements of small and longitudinally spaced elements or zones of the ground field. It may be desirable to project these images on a ground glass screen, as in a camera. In any case, the magnified images from the lenses directed to points forwardly and rearwardly of the ground terminal of the glide path will appear in rapid motion and, in fact, will show as streamlines moving toward or away from the image of the lens directed toward the terminal of the glide path which will have zero movement. In the case of lens systems giving upright images the movement of the streamlines will be outwardly away from the image having zero movement, while in the case of lens systems giving inverted images the movement of the streamlines will be inwardly toward the image having zero movement. The lenses are preferably shielded by a light-excluding hood arranged so that the pilot can take a sight to the ground outside the hood alongside the point or zone of zero movement, in the composite image. For this purpose it may be desirable to provide a number of external sights radially disposed to the pilot's eye-line and forming a series of sight zones corresponding in number with the zones of the lenses.

It is the purpose of the lens system to produce, as rapidly moving streamlines, the images of the various ground zones on either side of the zone toward which the flight path is directed, and for this purpose a clear definition of the images of the ground objects is unnecessary and may be undesirable. Furthermore, it is not essential that the pilot observe a specific ground object at the zone of zero movement in the instrument and then identify that object on the ground. It is merely necessary that he sight onto the ground past the side of the instrument opposite the point of zero movement therein. Thus, the objectives of small distortion and clearness of detail aimed at in most optical devices may here be sacrificed toward obtaining a high multiplication in the rate of image movement.

In the drawings—

Fig. 1 illustrates in side elevation a construction embodying the invention applied to an airplane, and also indicates diagrammatically the manner in which the construction is used to find the termination of the flight path, the airplane being shown to greatly exaggerated scale for the sake of clearness;

Fig. 2 is a view in side elevation illustrating another embodiment of the invention;

Figure 3:
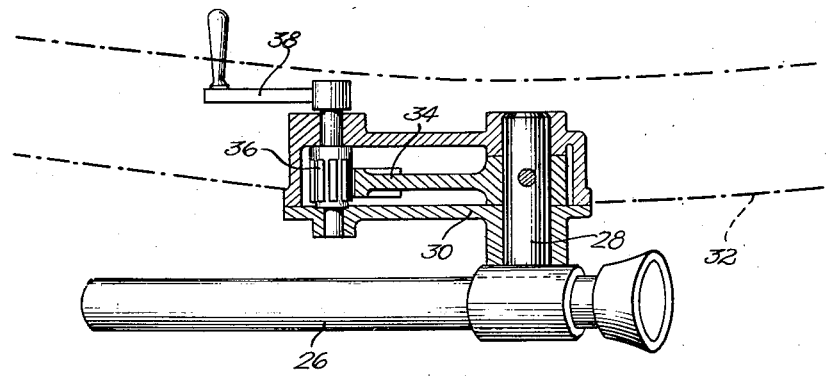
Fig. 3 is a view of the construction shown in Fig. 2, partly in plan and partly in section, taken substantially on the line 3—3 of Fig. 2.

Referring to Fig. 1, the reference numeral 10 indicates an airplane, shown to greatly exaggerated scale, and assumed to be gliding along the flight path 12. For the sake of clearness, this figure has been drawn to illustrate by the lines 11—11 and 13—13 two positions of the ground with relation to the airplane, as though the airplane were stationary and the ground were approaching it along the flight path. Thus two ground points first located at 14 and 16 will subsequently be located at 14a and 16a. The position of the pilot's eye is indicated at 22 in this figure, while 24 illustrates a plurality of sighting bars secured to the nose of the airplane about the pilot's eye point or eye line. It will now be seen that, because of the movement of a ground point from 14 to 14a, and of another ground point from 16 to 16a, a ground object at the point 14 will appear to the pilot while sighting through the sighting bars to be moving upwardly with relation to sighting bars, while a ground object at the point 16 will appear to be moving downwardly with relation to said bars. It will be obvious that when the pilot's sight line is directed at the ground point 8, which is on the actual flight path, he will observe no apparent movement of that point with relation to the sighting bar along which he sights, so long as the airplane is moving along the flight path 12—12. Thus, when the pilot's sight is directed at a point on the ground at which there is no apparent movement of ground objects with relation to the sighting bars, this indicates that the pilot is sighting along the flight path and that the point at which his sight is directed is the ground terminal of said path.

At very low altitudes this apparent movement of different portions of the landing field may be readily observed with the simple sighting device illustrated in Fig. 1. At high altitudes, however, the rate of divergence of the angle 14, 22, 16 during the descent of the airplane will be very slow so that the pilot will be forced to concentrate on the sights for a relatively protracted period in order to detect the apparent movement of the different parts of the field. The apparent rate of movement, however, may be greatly multiplied by means of a telescope or similar optical device of substantial magnifying power. In Figs. 2 and 3, such a telescope indicated at 26 is shown mounted on a trunnion 28 journaled in a housing 30 secured to the rim of the cockpit 32 of the airplane. This telescope is provided with means for readily adjusting its angle, such as the gear sector 34, the pinion 36 and crank handle 38.

Unless the telescope is directed parallel with the flight path, the magnified ground image will appear in rapid motion and the pilot will adjust the angle of the telescope by means of the handle 38 until he obtains zero movement of the image. With this adjustment, the telescope will be aligned with the flight path and may be used as a sight to obtain the ground terminal of said path.

Figure 4:
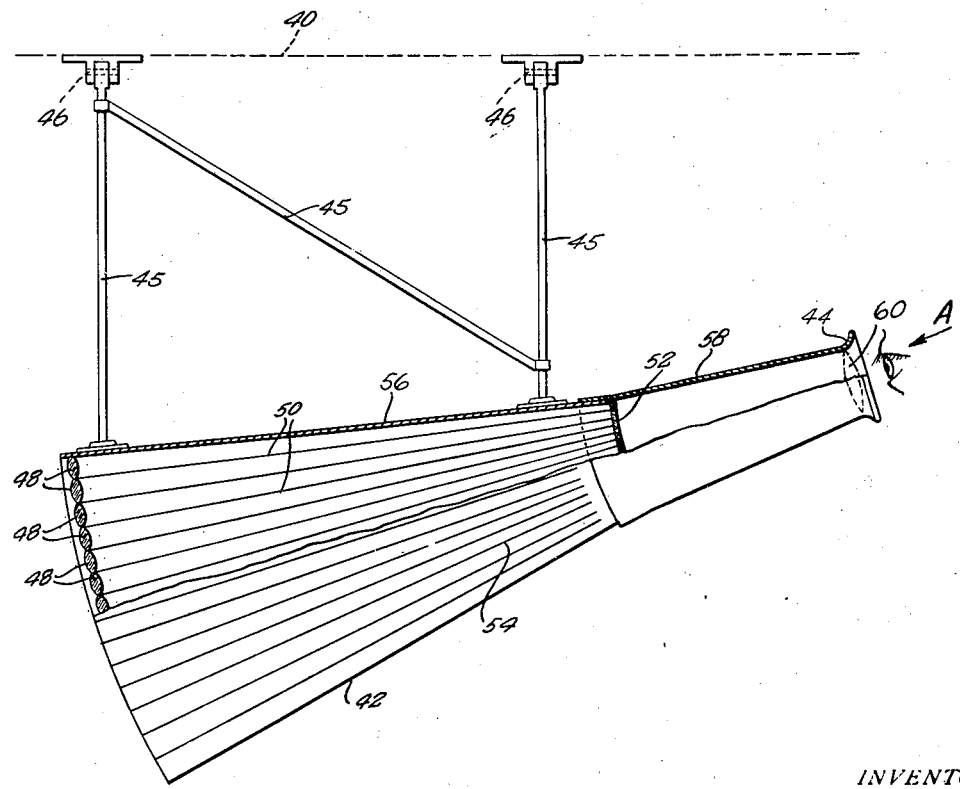
Fig. 4 is a view partly in side elevation and partly in section illustrating a third and preferred embodiment of the invention.
Figure 6:
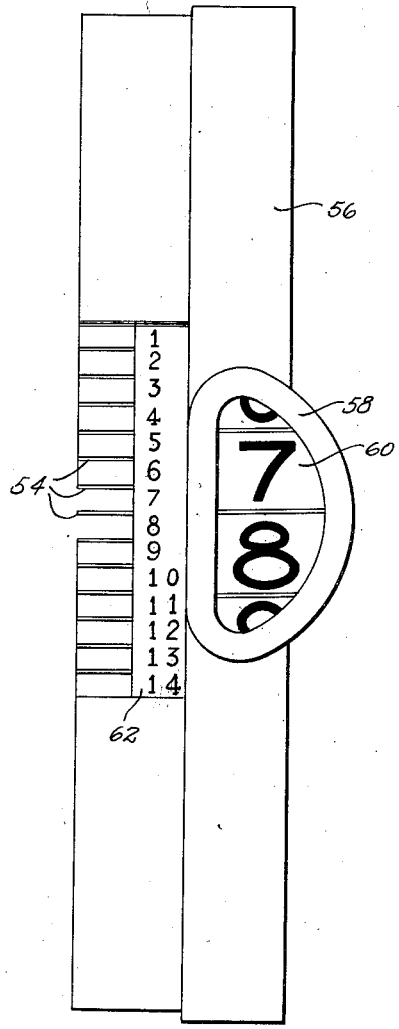
Fig. 6 is a view similar to Fig. 5 illustrating a slightly different construction.
Figure 5:
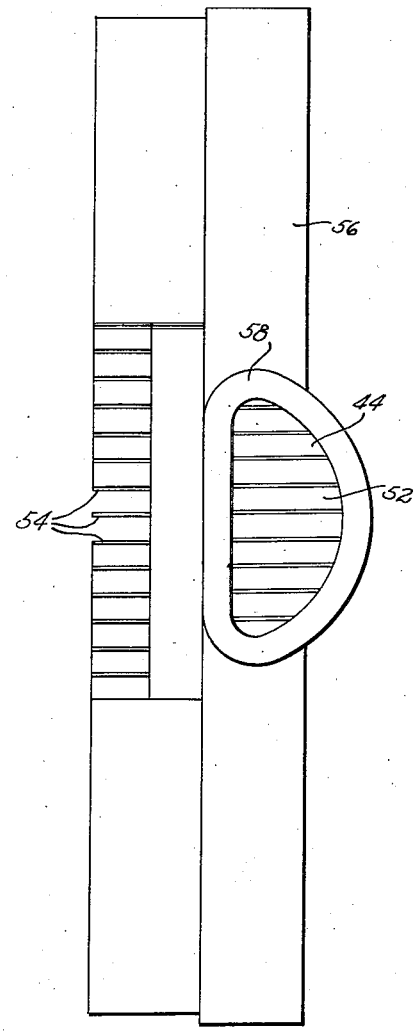
Fig. 5 is a view taken substantially in the direction of the arrow A, Fig. 4, and illustrating certain of the parts shown in said figure.

It may be undesirable in certain cases that the pilot be required to adjust the instrument to determine the flight path. Figs. 4, 5 and 6 show a construction in which no such adjustment by the pilot is required, and this construction constitutes the preferred embodiment of the invention. In Fig. 4 the line 40 represents a suitable surface in the airplane for the attachment of the device, such as the under surface of the roof of a cabin airplane. From this surface is suspended an instrument 42 having a sight aperture 44 located in a position convenient for the application of the pilot's eye thereto. The supporting means shown comprises bars 45 connected by hinges 46 to the roof of the cabin so that the instrument may be swung upward out of the way when not in use.

The instrument comprises a plurality of object lenses 48 arranged in arcuate disposition about the sight aperture 44 and subtending a sufficient angle to include the glide path range of the airplane. The instrument is internally divided into compartments radially of the sight aperture by non-reflecting partitions 50, and a ground-glass plate 52 is preferably placed at the focus of the object lenses. The lenses 48, the partitions 50 and the ground-glass screen 52 are enclosed by a light-excluding casing or cover 56 having an eye piece 58 in which the sight aperture 44 is formed. Exteriorly of said casing is mounted a plurality of sighting vanes 54, radial to the pilot's eye line and corresponding in number to the partitions 50. These sighting vanes are arranged respectively opposite said partitions to provide, between the same, corresponding sighting zones. It will be seen that the several radially disposed object lenses 48 respectively will throw magnified images of separated zones of the ground field onto the screen 52. From the previous description it will be obvious that these images will be in rapid motion, except for the image projected by the lens which is directed along the flight path. Because of the magnification produced by the lenses 48 this movement will appear to the pilot as streamlines on the screen 52 moving away from the band or zone of zero movement, which will thus be rendered obvious at a glance. Having located this zone on the screen, he will sight between the vanes 54 opposite to this zone of zero movement, and the sight thus found will be directed to the ground terminal of the flight path of the airplane.

It should be particularly noted that, even though the airplane may change its attitude, the point of zero movement in the instrument will, at all times, be aligned with the flight path, although the change in attitude will move this point of zero movement to a different zone on the screen 52.

In the construction shown in Fig. 5, and in full lines in Fig. 4, the entire magnification of the images of ground objects is produced by the lenses 48. When greater magnification than that obtainable with the simple lenses 48 is desired, the eye piece 58 may be equipped with one or more additional lenses to give a magnified image of the screen 52. As shown in dotted lines in Fig. 4, the eye piece 58 is provided with an additional lens 60 located substantially at the sight aperture of said eye piece. With such a construction, however, the apparent angle subtended by the screen will be increased and the apparent location of the zones of the screen will be distorted. It will, therefore, be advisable to identify these zones by numbering the same and to correspondingly number the spaces between the sighting vanes 54 so that the vane space corresponding to a specific zone of the screen 52 may be identified in spite of the distortion due to magnification. Thus, if the operator observes zero movement to be in zone No. 8 of the screen 52, he will sight through the correspondingly numbered vane space.

Fig. 6 shows a construction similar to that shown in Figures 4 and 5 in which numbers are applied to the screen 52 to indicate the various zones of the screen. Corresponding numbers are applied to a plate 62 extending laterally from the casing 56 at the inner ends of the sight bars or vanes 54 to indicate the vane spaces corresponding to the zones of the screen.

The devices above described are employed by the pilot in the following manner to find a terminal of the glide path of an airplane. The pilot initiates his landing approach by cutting off power at substantial altitude and assuming a specific angle of glide, as indicated by his air speed meter. He immediately locates in the instrument the zone of zero movement and sights thereby to the ground to find the ground terminal of the glide path of the airplane. Then, if necessary, he will maneuver while still at a safe altitude to bring the ground terminal of his glide path on the entering edge portion of the landing field. Thereafter he has merely to maintain a constant gliding speed which maintains the angle of the glide path constant.

In case of a forced landing due to engine failure, he will be informed immediately after he has assumed his normal glide, which of the available landing areas is closest to the terminal of his glide path. With the unaided eye, this determination often overtaxes the judgment even of experienced pilots who depend on skill in maneuvering after the terminal of the glide path has become apparent by the approach of the ship relatively close to the ground. With the device of this invention the unskilled pilot will be informed accurately of the ground terminal of his glide path immediately after he initiates it, and while he has ample altitude for safely making the necessary corrections.

It is to be understood that the invention is not limited to the particular construction and arrangement of parts of the illustrated embodiments of the invention, but that the invention may be embodied in other forms within the scope of the claims.

Having explained the nature and object of the invention, and having specifically described the preferred and certain other forms of the invention, what is claimed is:

1. An instrument for indicating the ground terminal of the glide path of an airplane comprising spaced sights defining a plurality of definite sight lines diverging from a common sighting point, certain of which lines are normally directed at points ahead of the termination of the flight path and others of which lines are normally directed at points at the rear of the termination of said path, said sights being adapted for observation therethrough of the apparent relative movement of points in the ground field for the determination of the point of zero movement thereon.

2. In an airplane, a glide path indicator comprising sights defining definite sight lines diverging from a common sighting point and normally directed toward points respectively ahead of and behind the ground terminal of the glide path for the observation of the apparent relative forward and backward movements of ground points for the purpose of locating said terminal.

3. An airplane landing gauge comprising a plurality of vertically spaced sights defining definite sight lines radiating from a common sighting point and normally bearing on ground points ahead of, at and behind the ground terminal of the glide path.

4. An airplane landing gauge comprising a plurality of spaced sights bounding definite sight zones directed normally from a common sighting point toward areas on the ground spaced ahead of and behind the ground terminal of the glide path and arranged to enable the pilot to observe the apparent relative movement of said points away from each other to locate on the ground the apparent point of origin of said movement.

5. An aircraft landing sight comprising a plurality of lenses mounted on an aircraft in positions directed along divergent sight lines to project respectively magnified images of the portions of the ground field on opposite sides of, and at the terminal of the flight path to locate said terminal.

6. An aircraft landing sight comprising a plurality of lenses mounted on an aircraft in positions to project respectively at a common sighting point magnified images of the portions of the ground field on opposite sides of, and at the terminal of the flight path and means for sighting the portion of the ground field at which the lens producing the image having zero movement is directed.

7. An aircraft landing sight comprising an eye piece and a plurality of lenses mounted on an aircraft and closely spaced in arcuate disposition about the eye piece and directed in directions substantially radial to a common sighting point to magnify the apparent relative movement of separate ground zones and means mounted on the aircraft adjacent the eye-pieces and lenses for obtaining a sight onto the ground along the centerline of such apparent movement.

8. An aircraft landing sight comprising a plurality of magnifying lenses in closely spaced arcuate disposition, subtending an angle including the glide path range of the aircraft and each arranged to magnify into streamlines the apparent movement of ground objects, a light-excluding hood having an eye aperture at the center of said arc, and radial projections along the side of said hood whereby a sight may be selected opposite the point of origin of said streamlines.

9. A method of finding the termination on the ground of the flight path of an aircraft, which comprises sighting successively at the ground through telescopic lenses along angularly spaced sight lines radiating from a common sighting point, certain of which lines are directed normally at points ahead of the ground terminal of the flight path and others of which lines are directed normally at points to the rear of the ground terminal of said path to find an image of a portion of the ground which has no apparent transverse movement with relation to the line of sight.

10. A method of finding the termination on the ground of the flight path of an aircraft, which comprises sighting at the ground from a common sighting point successively along a series of sights spaced in directions transverse to the direction of vision and defining definite sight lines, certain of which are directed normally at points ahead of the ground terminal of the flight path and others of which are directed normally at points to the rear of the ground terminal of said path to locate a point on the ground which has no apparent transverse movement with relation to one of said sights.

11. A method of finding the termination on the ground of the flight path of an aircraft, which comprises sighting successively at the ground through telescopic lenses along angularly spaced definite sight lines radiating from a common sighting point, certain of which lines are directed normally at points on the ground ahead of the termination of the flight path and others of which lines are normally directed at points on the ground to the rear of the termination of said path to find an image of a portion of the ground which has no apparent transverse movement with relation to the line of sight and thereafter sighting with the naked eye in the direction in which the lens producing said image is directed to locate the position of said portion of the ground.

ROLAND CHILTON.